US012661771B1

(12) United States Patent
Mallory et al.

(10) Patent No.: US 12,661,771 B1
(45) Date of Patent: Jun. 23, 2026

(54) POWER TOOL WITH ELECTRONIC SPINDLE POSITIONING

(71) Applicant: Robert Bosch GmbH, Stuttgart (DE)

(72) Inventors: Eric Mallory, Naperville, IL (US); Robert Lewton, Arlington Heights, IL (US); Christian Schweizer, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/987,063

(22) Filed: Dec. 19, 2024

(51) Int. Cl.
*B25F 5/00* (2006.01)
*B23Q 5/04* (2006.01)

(52) U.S. Cl.
CPC .............. *B25F 5/001* (2013.01); *B23Q 5/043* (2013.01)

(58) Field of Classification Search
CPC ........................................................ B25F 5/001
See application file for complete search history.

(56) References Cited

U.S. PATENT DOCUMENTS 8,587,231 B2 11/2013 Pant
11,331,732 B2 5/2022 Kani et al.

11,919,117 B2 3/2024 Mueckl et al.
2009/0134733 A1 5/2009 Matsubara et al.
2020/0368831 A1* 11/2020 Kani ...................... H02K 7/145
2021/0252652 A1* 8/2021 Mueckl ................. B23Q 5/043
2023/0216359 A1* 7/2023 Inuzuka ................. H02K 29/08
310/50

FOREIGN PATENT DOCUMENTS

WO 2024/002997 A1 1/2024

* cited by examiner

*Primary Examiner* — Michelle Lopez
(74) *Attorney, Agent, or Firm* — Maginot, Moore & Beck LLP

(57) ABSTRACT

A method for operating a power tool includes electronically braking a motor shaft of a brushless electric motor using a controller of the power tool. A spindle unit, positioned on the motor shaft, has a known rotational position relative to at least one pole of a plurality of poles of a rotor of the motor shaft. The method further includes stopping the motor shaft, using the controller, in a predetermined rotational position relative to a stator of the electric motor based on a detected position state of a plurality of position states as detected by a plurality of position sensors of the electric motor. The plurality of position states identify a rotational position of the rotor relative to the stator, and at the predetermined rotational position, a spindle lock of the power tool is configured to engage the spindle unit without additional rotation of the motor shaft.

18 Claims, 4 Drawing Sheets

OPERATE ELECTRIC MOTOR

508

ELECTRONICALLY BRAKE
THE ELECTRIC MOTOR

512

DETECT SENSOR STATE
FROM POSITION SENSORS

516

DETERMINE PREDETERMINED
ROTATIONAL POSITION

520

MOVE MOTOR SHAFT TO THE
DETERMINED POSITION

POWER TOOL WITH ELECTRONIC SPINDLE POSITIONING

FIELD

This disclosure relates to the field of power tools, and, in particular, to the improved operation of a spindle lock of a power tool.

BACKGROUND

Power tools include a spindle lock to selectively prevent rotation of a motor shaft of the power tool. With the spindle lock engaged, the user can tighten or loosen a holding nut, such as a collet nut or an arbor shaft nut, for example, of the power tool. Loosening the holding nut enables the user to remove an accessory connected to the power tool. Tightening the holding nut connects the accessory to motor shaft for rotation with the motor shaft. Exemplary accessories include saw blades and router bits.

In some power tools the spindle lock is difficult to operate. Specifically, in order to engage the spindle lock, the motor shaft must be precisely positioned relative to the spindle lock; otherwise, the spindle lock cannot be engaged. This requires the user to make several attempts at engaging the spindle lock while rotating slightly the motor shaft each time.

Based on the above, improvements to power tools are desired that simplify the engagement of a spindle lock.

SUMMARY

According to an exemplary embodiment of the disclosure, a method for operating a power tool includes electronically braking a motor shaft of a brushless electric motor of the power tool, using a controller of the power tool. A spindle unit, positioned on the motor shaft, has a known rotational position relative to at least one pole of a plurality of poles of a rotor of the motor shaft. The method further includes stopping the motor shaft, using the controller, in a predetermined rotational position relative to a stator of the electric motor based on a detected position state of a plurality of position states as detected by a plurality of position sensors of the electric motor. The plurality of position states identify a rotational position of the rotor relative to the stator, and at the predetermined rotational position, a spindle lock of the power tool is configured to engage the spindle unit without additional rotation of the motor shaft. When the spindle lock is engaged with the spindle unit, rotation of the motor shaft relative to the stator is prevented.

According to another exemplary embodiment of the disclosure, a power tool includes a brushless electric motor, a spindle unit, a spindle lock, and a controller. The brushless electric motor includes a stator, a motor shaft having a rotor mounted on the motor shaft, and a plurality of position sensors configured to output a plurality of position states corresponding to a rotational position of the rotor relative to the stator. The spindle unit is mounted on the motor shaft in a known rotational position relative to at least one pole of a plurality of poles of the rotor. The spindle lock is movable to a first position at which the spindle lock engages the spindle unit to prevent rotation of the motor shaft relative to the stator, and a second position at which the spindle lock is disengaged from the spindle unit and the motor shaft is configured for rotation relative to the stator. The controller is configured to control rotation of the motor shaft. The controller is further configured to electronically brake the motor shaft to slow rotation of the motor shaft, and to stop the motor shaft in a predetermined rotational position relative to the stator based on a detected position state. At the predetermined rotational position, the spindle lock is movable from the second position to the first position without additional rotation of the motor shaft.

BRIEF DESCRIPTION OF THE FIGURES

The above-described features and advantages, as well as others, should become more readily apparent to those of ordinary skill in the art by reference to the following detailed description and the accompanying figures in which:

FIG. 3A is a cross sectional view of a stator and the rotor of an electric motor of the power tool of FIG. 1, in FIG. 3A the rotor is in a position that prevents engagement of the spindle lock with the spindle unit;

FIG. 4A is a cross sectional view of the stator and the rotor of the electric motor of the power tool of FIG. 1, in FIG. 4A the rotor is positioned in a predetermined rotational position that enables engagement of the spindle lock with the spindle unit without requiring additional rotation of the motor shaft;

DETAILED DESCRIPTION

Figure 1:
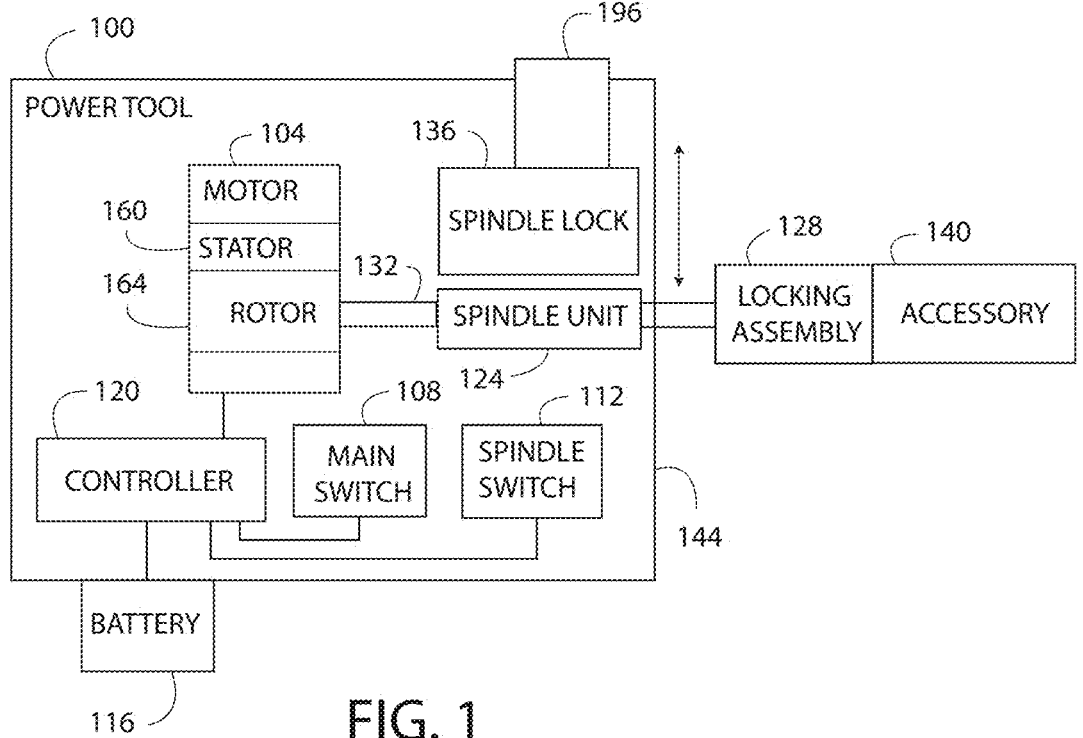
FIG. 1 is a block diagram of a power tool, as disclosed herein, having an improved system for operating the spindle lock.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, a power tool 100 includes a brushless electric motor 104, a main switch 108, a spindle switch 112, and a battery 116 each operably connected to a controller 120. The power tool 100 further includes a spindle unit 124 and a locking assembly 128 mounted on a motor shaft 132 of the electric motor 104. A spindle lock 136 is configured to selectively engage the spindle unit 124. An accessory 140 for performing a power tool operation is selectively mounted to the motor shaft 132 using the locking assembly 128.

As disclosed herein, the controller 120 is configured to stop the motor shaft 132 in a predetermined rotational position relative to a housing 144 of the power tool 100. In the predetermined rotational position, the spindle lock 136 is configured to engage the spindle unit 124 without requiring additional rotation of the motor shaft 132. Thus, the controller 120 simplifies the process of changing the accessory 140 by aligning the spindle unit 124 with the spindle lock 136. In an exemplary embodiment, the power tool 100 is provided as a router, but may alternatively be provided as any type of power tool, such as a saw, a grinder, a drill, or a handheld rotary tool. Each element of the power tool 100 is disclosed herein.

The electric motor 104 is a brushless electric motor that is located within the housing 144 of the power tool 100. In a specific embodiment, the electric motor 104 is a brushless direct current (BLDC) electric motor. The electric motor 104 includes a stator 160, a rotor 164, and the motor shaft 132. The stator 160 is fixed in position relative to the housing 144 of the power tool 100. The stator 160 includes a plurality of stator teeth 172, as shown in FIGS. 3A and 4A. In the illustrated example, the stator 160 includes nine of the stator teeth 172. In other embodiments, the stator 160 includes from three to thirty of the stator teeth 172. In FIGS. 3A and 4A, the stator teeth 172 are labeled with the values U, V, and W to label the stator phase connections of the AC electrical signals that are supplied to the stator 160 for operating the electric motor 104. The rotor 164 is configured for rotation about a rotational axis 176 (FIG. 2) relative to the stator 160 and the housing 144. The rotor 164 is fixedly mounted on the motor shaft 132 and is not movable relative to the motor shaft 132.

Figure 2:
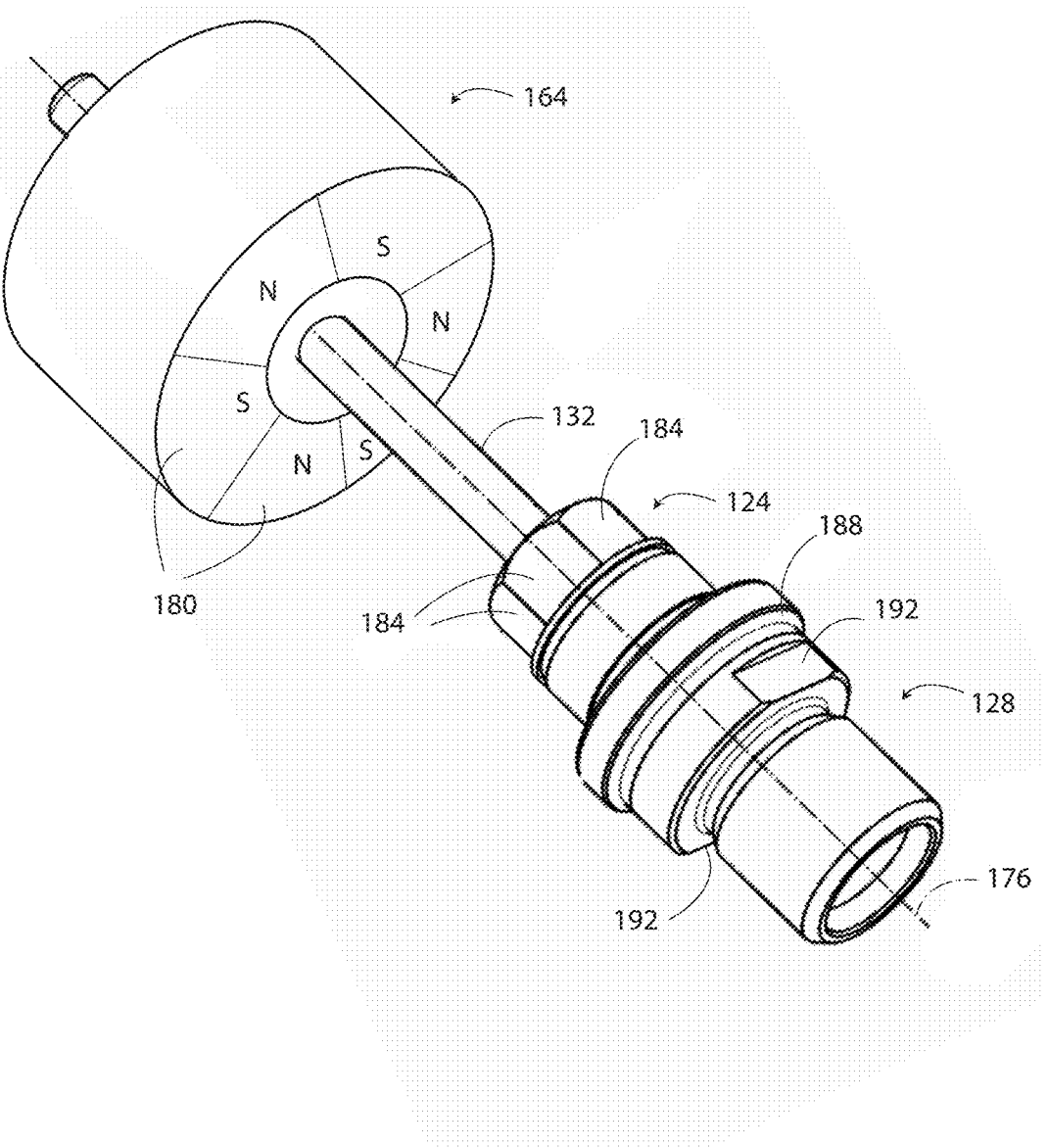
FIG. 2 is a perspective view of a motor shaft of the power tool of FIG. 1, the motor shaft is shown supporting a rotor, a spindle unit, and a locking assembly.

As shown in FIG. 2, the rotor 164 defines a plurality of magnetic poles 180. The rotor 164 is a permanent magnet type of rotor. In an exemplary embodiment, the rotor 164 has six poles 180 including three "north" poles 180 identified with an "N" in the drawings, and three "south" poles 180 identified with an "S" in the drawings. In other embodiments, the rotor 164 defines from two to twenty of the magnetic poles 180. The rotor 164 of the exemplary illustrated electric motor 104 moves or cogs in twenty degree (20°) mechanical steps. In other embodiments, the rotor 164 moves or cogs in mechanical steps of from six to sixty degrees (6° to 60°).

Figure 3B:
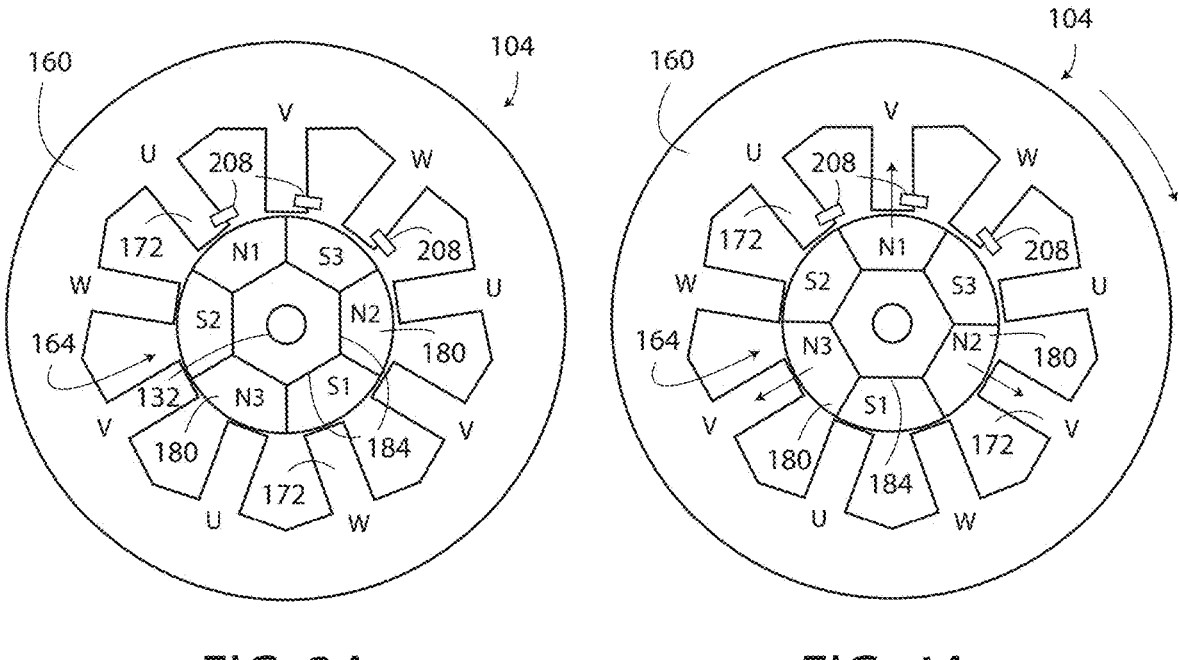
FIG. 3B is a cross sectional view showing that in the rotor position of FIG. 3A, the spindle lock and the spindle unit are misaligned, such that engagement of the spindle lock with the spindle unit is prevented by two interference points.
Figure 3B:
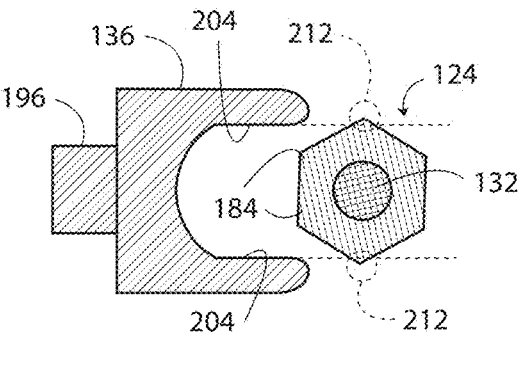
Figure 4B:
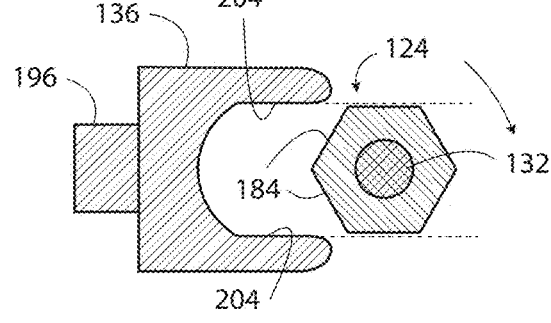
FIG. 4B is a cross sectional view showing that in the rotor position of FIG. 4A the spindle lock and the spindle unit are aligned, such that the rotor is in a position that enables engagement of the spindle lock with the spindle unit without any interference points and without rotation of the motor shaft.

As also shown in FIGS. 2, 3A, and 4A, the spindle unit 124 is mounted on the motor shaft 132 in a known rotational position relative to the rotor 164. The illustrated spindle unit 124 defines a hexagonal periphery having six flat sides 184 including a first flat side 184 (FIGS. 3B and 4B) and a second flat side 184 (FIGS. 3B and 4B). In other embodiments, the spindle unit 124 includes from one to ten of the flat sides 184. In the known rotational position of the spindle unit 124 relative to the rotor 164, each flat side 184 is rotationally aligned with a corresponding pole 180, as is illustrated in FIGS. 3A and 4A. Based on the known rotational position, when the controller 120 determines the position of the rotor 164, the positions of the flat sides 184 of the spindle unit 124 are also known. As a result, alignment and positioning of the spindle unit 124 is accomplished by the controller 120 by controlling and determining the position of the poles 180 of the rotor 164.

With reference to FIG. 2, the exemplary locking assembly 128 is mounted on the motor shaft 132 and includes a collet nut 188 that is tightened to connect the accessory 140 to the motor shaft 132 and that is loosened to enable separation of the accessory 140 from the motor shaft 132. The collet nut 188 defines at least two flat edges 192 that are configured to receive a wrench for tightening and loosening of the collet nut 188. In other embodiments, the locking assembly 128 is provided as an arbor shaft and arbor shaft nut or any other accessory mounting structure.

As shown in FIG. 1, the spindle lock 136 is positioned to engage with the spindle unit 124. The spindle lock 136 includes a button 196 located outside of the housing 144. The spindle lock 136 is movable to a first position (FIG. 4C) at which the spindle lock 136 engages the spindle unit 124 (also referred to as a locked position), and a second position (FIGS. 3B and 4B) at which the spindle lock 136 is disengaged from the spindle unit 124 (also referred to as an unlocked position). As shown in FIG. 3B, the exemplary spindle lock 136 defines a "U" shape and/or a fork shape, and includes two flat sides 204 (a third flat side 204 and a fourth flat side 204). The flat sides 204 of the spindle lock 136 are parallel to each other. In other embodiments, the flat sides 204 may define a curvature other feature for engaging the spindle unit 124. Thus, the flat sides 204 are exemplary are not completely flat in some embodiments.

Figure 4C:
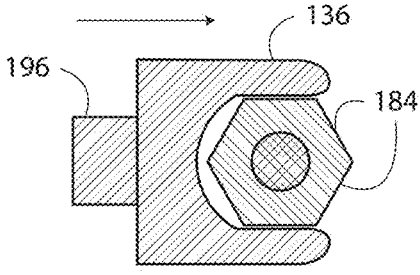
FIG. 4C is a cross sectional view of the spindle lock and the spindle unit of the power tool of FIG. 1 showing the spindle lock engaged with the spindle unit.

In the locked position, the spindle lock 136 prevents rotation of the motor shaft 132 relative to the stator 160 and the housing 144. That is, the spindle lock 136 functions as a wrench or holder by surrounding the spindle unit 124 and preventing rotation thereof, as shown in FIG. 4C. In the unlocked position of the spindle lock 136, the motor shaft 132 is configured for rotation relative to the stator 160 and the housing 144. In one embodiment, the spindle lock 136 is biased to the unlocked position, and the button 196 is pressed to move the spindle lock 136 to the locked position. Thus, the spindle lock 136 is normally in the unlocked position.

In other embodiments, any other configuration and/or shape of the spindle lock 136, spindle unit 124, the flat sides 204, and the flat edges 192 may be included in the power tool 100.

The battery 116 includes a plurality of battery cells (not shown) each configured to supply electrical energy to the power tool 100. The battery 116, which is also referred to as a battery pack, is rechargeable. In one embodiment, the battery 116 is provided as a lithium-ion battery. The electrical energy for operating the electric motor 104 and the controller 120 is provided by the battery 116. The battery 116 is removably connected to the housing 144.

In other embodiments, the power tool 100 is additionally or alternatively powered by a connection to a mains power supply, such as a wall outlet that provides a source of alternating current power (AC power). The power tool 100 may be referred to a hybrid power tool when the power tool 100 is powered by both battery power and mains power.

As shown in FIG. 1, the controller 120 is operably connected to the electric motor 104, the battery 116, the main switch 108, and the spindle switch 112. The controller 120 is configured to execute program instruction data to operate the power tool 100 including program instruction data corresponding to the method 500. The controller 120 is provided as at least one microcontroller and/or microprocessor.

The main switch 108 is operably connected to the electric motor 104 and the controller 120. The main switch 108 is configurable in a closed state (e.g., an "on" position) and an open state (e.g., an "off" position). The main switch 108 is also referred to as a power switch of the power tool 100 and is normally positioned in the open state. When the controller 120 detects that the main switch 108 is in the closed state, the controller 120 supplies the electric motor 104 with electrical energy from the battery 116 for rotating the motor shaft 132 and the accessory 140. When the controller 120 detects that the main switch 108 is in the open state, the controller 120 causes the accessory 140 and the motor shaft 132 to stop rotating by electronically braking the motor shaft 132, and the controller 120 automatically aligns the spindle unit 124 with the spindle lock 136 according to the method 500, as explained below.

The spindle switch 112 is operably connected to the spindle lock 136 and the controller 120. The spindle switch 112 is configurable in a closed state and an open state. In one embodiment, the spindle switch 112 is in the open state when the spindle lock 136 is in the unlocked position, and the spindle switch 112 is in the closed state when the spindle lock 136 is in the locked position. Thus, the controller 120 uses the spindle switch 112 to detect the position of the spindle lock 136. Further operation of the spindle switch 112 is described with reference to the method 500.

As shown in FIGS. 3A and 3B, the electric motor 104 also includes a plurality of position sensors. As described herein, the position sensors are Hall sensors 208. In another embodiment, instead of or in addition to the Hall sensors 208, the electric motor 104 includes other positioning sensors for determining the position of the motor shaft 132 relative to the stator 160. The other types of position sensors include, but are not limited to, optical encoders and resolvers, magnetic encoders and resolvers, and capacitive sensors. The method 500 is operable with each type of position sensor.

The position sensors are configured to output a position state of a plurality of position states. The position states correspond to a rotational position of the rotor 164 relative to the stator 160. The position states of the Hall sensors 208 are referred to as Hall states. Accordingly, the Hall sensors 208 are configured to output a Hall state of a plurality of Hall states corresponding to a rotational position of the rotor 164 relative to the stator 160.

The controller 120 uses the position sensors (including the Hall sensors 208) to determine the rotational position of the motor shaft 132 and the corresponding spindle unit 124. In the exemplary embodiment, three of the Hall sensors 208 are included. Each Hall sensor 208 is mounted on or near a stator tooth 172 of the stator 160. In an embodiment, each Hall sensor 208 is mechanically displaced ten rotational degrees (10°) with respect to the rotational axis 176 in a forward or clockwise direction from a center of a corresponding stator tooth 172. In other embodiments, and depending on the number of stator teeth 172 and rotor poles 180, the Hall sensors 208 have a different mechanical and/or rotational position relative to the stator teeth 172.

The Hall sensors 208 are configured to output a "1" or other "high" signal when a north pole 180 of the rotor 164 is detected. The Hall sensors 208 are configured to output a "0" or other "low" signal when a south pole 180 of the rotor 164 is detected. Accordingly, the Hall states are the different combinations of binary outputs produced by the Hall sensors 208. In the example of FIGS. 3A and 4A, the phase "U" is assigned the Hall sensor 208 having "1" decimal value, the phase "V" is assigned the Hall sensor 208 having the "2" decimal value, and the phase "W" is assigned the Hall sensor 208 having the "4" decimal value. In another embodiment, the Hall sensors 208 are biased to output a "0" or other "low" signal when one of the north poles 180 of the rotor 164 is detected, and to output a "1" or other "high" signal when one of the south poles 180 of the rotor 164 is detected.

The controller 120 uses the Hall states to determine which phase coils (not shown, each phase coil is wrapped around a corresponding stator tooth 172) of the stator 160 to energize to maintain rotation of the motor shaft 132 and to produce torque on the motor shaft 132. For example, in FIG. 3A, the first north pole (N1) is detected by the first Hall sensor 208, and the third south pole (S3) is detected by the second and the third Hall sensor 208. Thus, the resulting binary output is 001 (decimal value of 1, Hall State 1). Each of the possible Hall states, along with the resulting voltage control of the phase coils, are shown in Table 1.

TABLE 1

| | Hall States | | | | | |
|---|---|---|---|---|---|---|
| | 1 | 3 | 2 | 6 | 4 | 5 |
| U | 1 | 1 | 0 | 0 | 0 | 1 |
| V | 0 | 1 | 1 | 1 | 0 | 0 |
| W | 0 | 0 | 0 | 1 | 1 | 1 |
| | Phase Connections | | | | | |
| U | – | – | 0 | + | + | 0 |
| V | 0 | + | + | 0 | – | – |
| W | + | 0 | – | – | 0 | + |

During rotation of the motor shaft 132, the motor shaft 132 advances through the plurality of Hall states in a sequential order. The sequential order, in one embodiment, is 1, 3, 2, 6, 4, 5 repeating. The Hall states correspond to the decimal value of the binary outputs produced by the Hall sensors 208.

Figure 5:
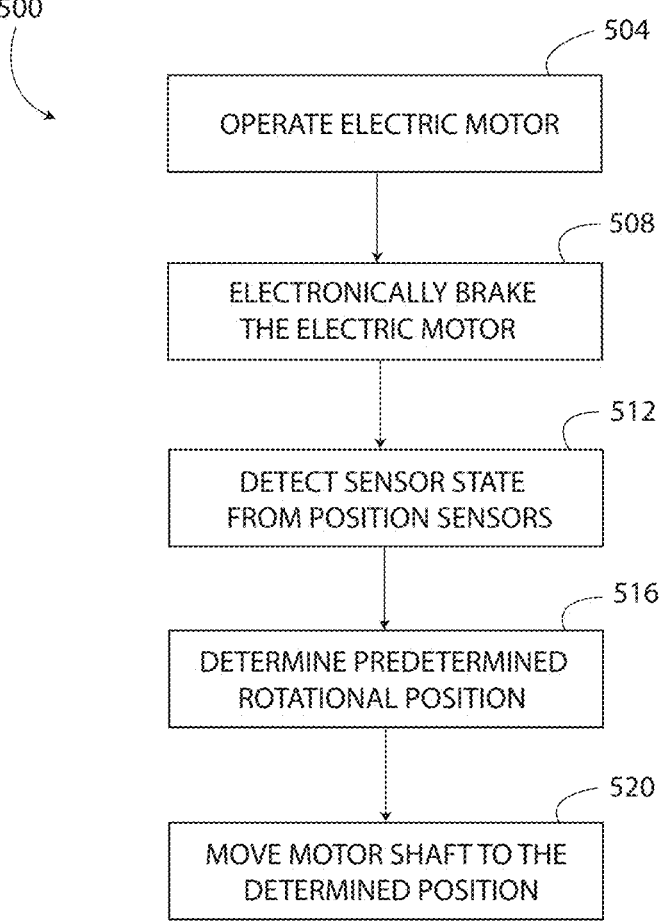
FIG. 5 is a flowchart illustrating a method of operating the power tool of FIG. 1 to position the motor shaft in the predetermined rotational position of FIG. 4A.

The flowchart of FIG. 5 illustrates a method 500 of operating the power tool 100. In the method 500, the controller 120 uses a detected Hall state (a detected position state, in other embodiments) of the Hall sensors 208 (or position sensors) to determine a position of the rotor 164 and an amount of rotational movement that is required to position the motor shaft 132 in a predetermined rotational position of a plurality of predetermined rotational positions. In the predetermined rotational position, the spindle lock 136 is configured to engage the spindle unit 124 without rotation of the motor shaft 132. The motor shaft 132 has from one to ten of the predetermined rotational positions depending on the embodiment. In the exemplary embodiment, the motor shaft 132 has three of the predetermined rotational positions spaced apart by 120 mechanical degrees (120°).

At block 504, the method 500 includes operating the electric motor 104 to perform a power tool operation using the accessory 140, such as routing an edge of a workpiece (not shown) or cutting a workpiece. During operation of the electric motor 104, the main switch 108 is in the "on" position and the spindle switch 112 is in the open position indicating that the spindle lock 136 is in the unlocked position. The electric motor 104 is operated to rotate the motor shaft 132 and the accessory 140 using phase voltages applied to the stator 160 based on the feedback from the Hall sensors 208.

At block 508 of the method 500, the controller 120 is configured to electronically brake the electric motor 104 to very quickly reduce the speed of rotation of the motor shaft 132 and the accessory 140. The controller 120 is configured to electronically brake the electric motor 104 each time when the main switch 108 is moved from the "on" position to the "off" position and/or when the spindle switch 112 is moved to closed position during operation of the electric motor 104. In one embodiment, the controller 120 brakes the motor shaft 132 to a standstill during the electronic braking. In another embodiment, the controller 120 brakes the motor shaft 132 to a predetermined speed that is substantially slower than the full speed of the motor shaft 132 when operated during the power tool operation. Substantially slower includes speeds that are at least 95% slower than the full speed.

Electronic braking of the electric motor 104 is different from mechanical braking and is different from allowing the motor shaft 132 to "coast" to a stop from frictional forces. Electronic braking includes using electrical signals applied to the stator 160 to actively slow down or stop the rotation of the motor shaft 132. For example, in one embodiment, the controller 120 is configured to electronically brake the motor shaft 132 from full rotational speed to a standstill in less than two seconds and in some embodiments in less than one second.

Next, at block 512 of the method 500, after performing the electronic braking, the controller 120 is configured to detect the Hall state from the Hall sensors 208. The Hall state is detected with the motor shaft 132 in the standstill position or when the motor shaft 132 is rotating at the slower predetermined speed. FIGS. 3A and 3B show the configuration of the electric motor 104, the spindle unit 124, and the spindle lock 136 when the Hall state is detected.

In FIG. 3A the detected Hall state is Hall state "1" based on the position of the rotor 164. As shown in FIG. 3B, at the rotational position corresponding to the detected Hall state, the spindle unit 124 is misaligned with the spindle lock 136, such that if the user were to advance the spindle lock 136 to the locked position using the button 196, then the spindle lock 136 would jam against the spindle unit 124 and would not engage the spindle unit 124. Specifically, the spindle lock 136 would contact the spindle unit 124 at two interference points 212. The interference points 212 prevent the spindle lock 136 from advancing to the locked position.

Next, at block 516 of the method 500, the controller 120 is configured to determine the predetermined rotational position of the motor shaft 132 at which the spindle lock 136 is configured to engage the spindle unit 124. The predetermined rotational position is determined based on the detected Hall state. As mentioned, at the predetermined rotational position, no additional rotation of the motor shaft 132 is required in order to engage the spindle lock 136 with the spindle unit 124.

For example, in one embodiment, the predetermined rotational position is determined based on an idle phase of the plurality of stator phase connections. In particular, a polarity of the idle phase that rotates the motor shaft 132 to one of the predetermined rotational positions is a polarity of the idle phase during an immediate previous Hall state (or an immediate previous position state) from the detected Hall state according to the sequential order of the Hall states. The process is summarized in Table 2 and is explained below.

TABLE 2

| Last Hall State | 1 | 3 | 2 | 6 | 4 | 5 |
|---|---|---|---|---|---|---|
| Phase to Lock | V | W | U | V | W | U |
| Orientation | L | H | L | H | L | H |

Continuing the example from above, when the detected Hall state is Hall state "1," Table 1 shows that the stator phase V is the idle phase. The phases identified with a "0" are the idle phases in Table 1. From Table 1 or 2 it is shown that Hall state "5" is the immediate previous Hall state from the detected Hall state of "1". From Table 1 it is shown that the stator phase V is low (i.e., "-") in Hall state 5. Thus, when the detected Hall state is Hall state "1", the phase V is the phase to lock (i.e., the idle phase) and is locked by making the state phase V low. Table 2 identifies each of the phases to lock and the corresponding polarity. The "phase to lock" is the idle phase from Table 1. An orientation of "L" is a low orientation, which is a negative polarity signal. An orientation of "H" is a high orientation, which is a positive polarity signal.

Next, at block 520, the controller 120 is configured to move the motor shaft 132 to the predetermined rotational position and to stop and/or to lock the motor shaft 132 in the predetermined rotational position. The controller 120 moves the motor shaft 132 by applying the determined orientation to the stator phase to lock according to the determined Hall state. In the example from above, the controller 120 applies a low orientation to the V stator phase to move the motor shaft 132 to the predetermined rotational position. The radially outward arrows in FIG. 4A show that the poles 180 labeled as N1, N2, and N3 are located to the V stator phase.

At block 520 to move the motor shaft 132, the controller 120 activates predetermined switches of a set of switches (not shown). For example, in one embodiment a six-switch electric motor driving technique is utilized. The switches are activated by the controller 120 to apply the corresponding orientation to the corresponding idle stator phase based on the detected Hall state.

At block 520, the motor shaft 132 is rotated about the rotational axis 176 in order to move from the position resulting in the detected Hall state to the determined predetermined rotational position. The amount of rotation is based on several factors including the number of poles 180, the number of stator teeth 172, and the relative position of the rotor 164 at the position resulting in the detected Hall state. In this example having three of the predetermined rotational positions spaced 120° apart, the movement of motor shaft 132 to the closest predetermined rotational position is at most 100°, but the controller 120 may rotate the motor shaft 132 further if the controller 120 determines that one or more of the predetermined rotational positions should be skipped. The controller 120 may rotate the motor shaft 132 any rotational amount to move from the position resulting in the detected Hall state to the determined predetermined rotational position.

As shown by comparing FIGS. 3A and 4A, in the illustrated example, the motor shaft 132 is moved about thirty degrees in the direction of the corresponding arrow (clockwise). As shown by comparing FIGS. 3B and 4B, at the predetermined rotational position, there are no interference points 212, and the spindle lock 136 is configured to engage the spindle unit 124 without rotation of the motor shaft 132. Specifically, in the predetermined rotational position, two of the flat sides 184 of the spindle unit 124 and the flat sides 204 of the spindle lock 136 are substantially parallel (as shown by the dashed lines), so that the spindle lock 136 is movable to the locked position over the spindle unit 124, without additional rotation or movement the motor shaft 132. As used herein, substantially parallel includes plus or minus five degrees (5°) from parallel.

At block 520, in one embodiment, when the motor shaft 132 is moved to the determined predetermined rotational position, the Hall sensors 208 indicate that the motor shaft 132 is positioned at a Hall state boundary. The Hall state boundary is a boundary between two different Hall states. The boundary is between sequential Hall states. When the motor shaft 132 is positioned and/or locked at the Hall state boundary, the detected Hall state may change between the two neighboring Hall states, and the controller 120 may utilize a specialized approach for instituting rotation of the motor shaft 132 upon the next activation of the power tool 100.

In the exemplary embodiment, the motor shaft 132 rotates in a clockwise direction during operation of the power tool 100 and during movement of the motor shaft 132 to the determined predetermined rotational position. The determined predetermined rotational position may be the rotationally closest predetermined rotational position. Or, depending on the particular detected Hall state, the controller 120 may skip a predetermined rotational position in selecting the determined predetermined rotational position. Any of the available predetermined rotational positions may be utilized by the controller 120 for each of the Hall states. In other embodiments, the controller 120 is configured to move the motor shaft 132 clockwise and/or counterclockwise to the determined predetermined rotational position.

As a result of the method at block 520, the controller 120 has positioned the spindle unit 124 to receive the spindle lock 136 without requiring any additional rotation of the motor shaft 132. The method 500 makes changing the accessory 140 easier for the operator because the spindle lock 136 can be engaged on the first press of the button 196 (or movement of a lever, in some embodiments) without requiring the user to manually rotate the accessory 140 and/or the motor shaft 132 to find one of the rotational position in which there are no interference points 212 (i.e., one of the predetermined rotational positions).

As noted above, at block 508 there are at least two approaches to performing the electronic braking using the controller 120. According to the first braking approach, the controller 120 is configured to stop the motor shaft 132 by electronically braking the motor shaft 132 to a standstill during the electronic braking. Then, the controller 120 determines the detected Hall state. Next, the controller 120 determines the predetermined rotational position based on the detected Hall state. Then, the controller 120 rotates the motor shaft 132 to the determined closest predetermined rotational position by applying the determined polarity to the idle phase of the stator 160. Thus, according to the "standstill" approach, the motor shaft 132 is stopped twice during the method 500. The first stop is a preliminary stop used to determine how far the motor shaft 132 should be rotated, and the second stop is the final stop that results in alignment of the spindle lock 136 with the spindle unit 124. The controller 120 positions the motor shaft 132 at the preliminary stop for 0.1 to 1.5 seconds, in one embodiment.

According to a second braking approach at block 508, the controller 120 electronically brakes the motor shaft 132 to a non-zero predetermined speed. Then, at blocks 512, 516, and 520, the controller 120 calculates a ramp down procedure that causes the motor shaft 132 to slow from the predetermined speed to a standstill. The ramp down procedure is calculated so that when the motor shaft 132 arrives to the standstill, the motor shaft 132 is in the predetermined rotational position. The ramp down procedure includes detecting the Hall state when the motor shaft 132 is rotating at the predetermined speed. The controller 120 implements the ramp down procedure, so that the motor shaft 132 slows from the predetermined speed and stops directly at the predetermined rotational position. Thus, the ramp procedure results in the motor shaft 132 stopping only once during the method 500. A time duration of the ramp procedure is from 0.5 to 2 seconds, in one embodiment.

According to the method 500, the controller 120 operates the power tool 100 based on the positions of the main switch 108 and the spindle switch 112. Specifically, the controller 120 detects the state of the main switch 108 and the spindle switch 112. The controller 120 operates the electric motor 104 to rotate the motor shaft 132 and the corresponding accessory 140 when the controller 120 detects that the main switch 108 is in the closed state (the "on" state) and the spindle switch 112 is in the open state (the "off" state). The controller 120 is configured to perform the electronic braking (block 508), when the controller 120 detects that the main switch 108 has transitioned from the closed state to the open state. The controller 120 is also configured to perform the electric braking (block 508), when the controller 120 detects that the main switch 108 is in the closed state and the spindle switch 112 is in the closed state. Thus, the controller 120 potentially prevents damage to the power tool 100, when the spindle lock 136 is moved or is attempted to be moved to the locked position when the electric motor 104 is operational and is rotating the motor shaft 132.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for operating a power tool, comprising:
electronically braking a motor shaft of a brushless electric motor of the power tool, using a controller of the power tool, wherein a spindle unit positioned on the motor shaft has a known rotational position relative to at least one pole of a plurality of poles of a rotor of the motor shaft;
stopping the motor shaft, using the controller, in a predetermined rotational position relative to a stator of the electric motor based on a detected position state of a plurality of position states as detected by a plurality of position sensors of the electric motor,
wherein the plurality of position states identify a rotational position of the rotor relative to the stator, wherein at the predetermined rotational position a spindle lock of the power tool is configured to engage the spindle unit without additional rotation of the motor shaft, and wherein when the spindle lock is engaged with the spindle unit, rotation of the motor shaft relative to the stator is prevented.

2. The method of claim 1, further comprising:

electronically braking the motor shaft to a standstill during the electronic braking of the motor shaft using the controller.

3. The method of claim 2, wherein:

the predetermined rotational position is included in a plurality of predetermined rotational positions, the rotational position of the motor shaft at the standstill results in the detected position state, the method further comprises:

determining, using the controller, the predetermined rotational position of the plurality of predetermined rotational positions based on the detected position state; and rotating the motor shaft, using the controller, to rotate the motor shaft to the determined predetermined rotational position.

4. The method of claim 1, further comprising:

electronically braking the motor shaft to a predetermined speed during the electronic braking of the motor shaft using the controller;

calculating, using the controller, a ramp down procedure that causes the motor shaft to slow from the predetermined speed to a standstill, with the motor shaft being in the predetermined rotational position at the standstill; and implementing the ramp down procedure, using the controller, so that the motor shaft slows from the predetermined speed and stops directly at the predetermined rotational position.

5. The method of claim 1, wherein:

during rotation of the motor shaft, the motor shaft advances through the plurality of position states in a sequential order, and the predetermined rotational position is determined based on an idle phase of a plurality of stator phase connections during the detected position state.

6. The method of claim 5, wherein:

a polarity of the idle phase that moves the motor shaft to the predetermined rotational position is a polarity of the idle phase during an immediate previous position state from the detected position state according to the sequential order of the position states.

7. The method of claim 1, wherein:

the plurality of position sensors include a plurality of Hall sensors, and the plurality of position states includes a plurality of Hall states.

8. The method of claim 1, further comprising:

detecting that a main switch of the power tool is in a closed state or an open state using the controller;

operating the electric motor to rotate an accessory when the controller detects that the main switch is in the closed state, the accessory operably connected to the motor shaft; and performing the electronic braking and then the stopping of the motor shaft at the predetermined rotational position when the controller detects that the main switch is in the open state.

9. The method of claim 8, further comprising:

detecting that a spindle switch is in a closed state or an open state using the controller;

operating the electric motor to rotate the accessory when the controller detects that the main switch is in the closed state and the spindle switch is in the open state; and performing the electronic braking and then the stopping of the motor shaft at the predetermined rotational position when the controller detects that the main switch is in the closed state and the spindle switch is in the closed state.

10. A power tool, comprising:

a brushless electric motor including (i) a stator, (ii) a motor shaft having a rotor mounted on the motor shaft, and (iii) a plurality of position sensors configured to output a plurality of position states corresponding to a rotational position of the rotor relative to the stator;

a spindle unit mounted on the motor shaft in a known rotational position relative to at least one pole of a plurality of poles of the rotor;

a spindle lock movable to (i) a first position at which the spindle lock engages the spindle unit to prevent rotation of the motor shaft relative to the stator, and (ii) a second position at which the spindle lock is disengaged from the spindle unit and the motor shaft is configured for rotation relative to the stator; and a controller configured to control rotation of the motor shaft, the controller configured to:

electronically brake the motor shaft to slow rotation of the motor shaft, and stop the motor shaft in a predetermined rotational position relative to the stator based on a detected position state, wherein at the predetermined rotational position the spindle lock is movable from the second position to the first position without additional rotation of the motor shaft.

11. The power tool according to claim 10, wherein the controller is configured to electronically brake the motor shaft to a standstill during the electronic braking of the motor shaft.

12. The power tool according to claim 11, wherein:

the predetermined rotational position is included in a plurality of predetermined rotational positions, the rotational position of the motor shaft at the standstill results in the detected position state, and the controller is further configured to:

determine the predetermined rotational position of the plurality of predetermined rotational positions based on the detected position state, and rotate the motor shaft to move the motor shaft to the determined predetermined rotational position.

13. The power tool according to claim 10, wherein the controller is further configured to:

electronically brake the motor shaft to a predetermined speed during the electronic braking of the motor shaft, calculate a ramp down procedure that causes the motor shaft to slow from the predetermined speed to a standstill, with the motor shaft being in the predetermined rotational position at the standstill, and implement the ramp down procedure so that the motor shaft slows from the predetermined speed and stops directly at the predetermined rotational position.

14. The power tool according to claim 13, wherein:

during rotation of the motor shaft, the motor shaft advances through the plurality of position states in a sequential order, and the predetermined rotational position is determined based on an idle phase of a plurality of stator phase connections during the detected position state.

15. The power tool according to claim 14, wherein:

a polarity of the idle phase that moves the motor shaft to the predetermined rotational position is a polarity of the idle phase during an immediate previous position state from the detected position state according to the sequential order of the position states.

16. The power tool according to claim 10, wherein:

the plurality of position sensors include a plurality of Hall sensors, and the plurality of position states includes a plurality of Hall states.

17. The power tool according to claim 10, further comprising:

a main switch operably connected to the electric motor and the controller, the main switch configurable in a closed state and an open state, wherein the controller is further configured to:

detect that the main switch is in the closed state or the open state, operate the electric motor to rotate an accessory when the main switch is in the closed state, the accessory operably connected to the motor shaft of the electric motor, and perform the electronic braking and then the stopping of the motor shaft at the predetermined rotational position when the main switch is in the open state.

18. The power tool according to claim 17, further comprising:

a spindle switch operably connected to the spindle lock and the controller, the spindle switch configurable in a closed state and an open state, wherein the controller is further configured to:

detect that the spindle switch is in the closed state or the open state, operate the electric motor to rotate the accessory when the main switch is in the closed state and the spindle switch is in the open state, and perform the electronic braking and then the stopping of the motor shaft at the predetermined rotational position when the main switch is in the closed state and the spindle switch is in the closed state.

* * * * *